Oct. 29, 1957 R. R. GALBREATH 2,811,586
INTERCOMMUNICATION SYSTEM
Filed April 2, 1954
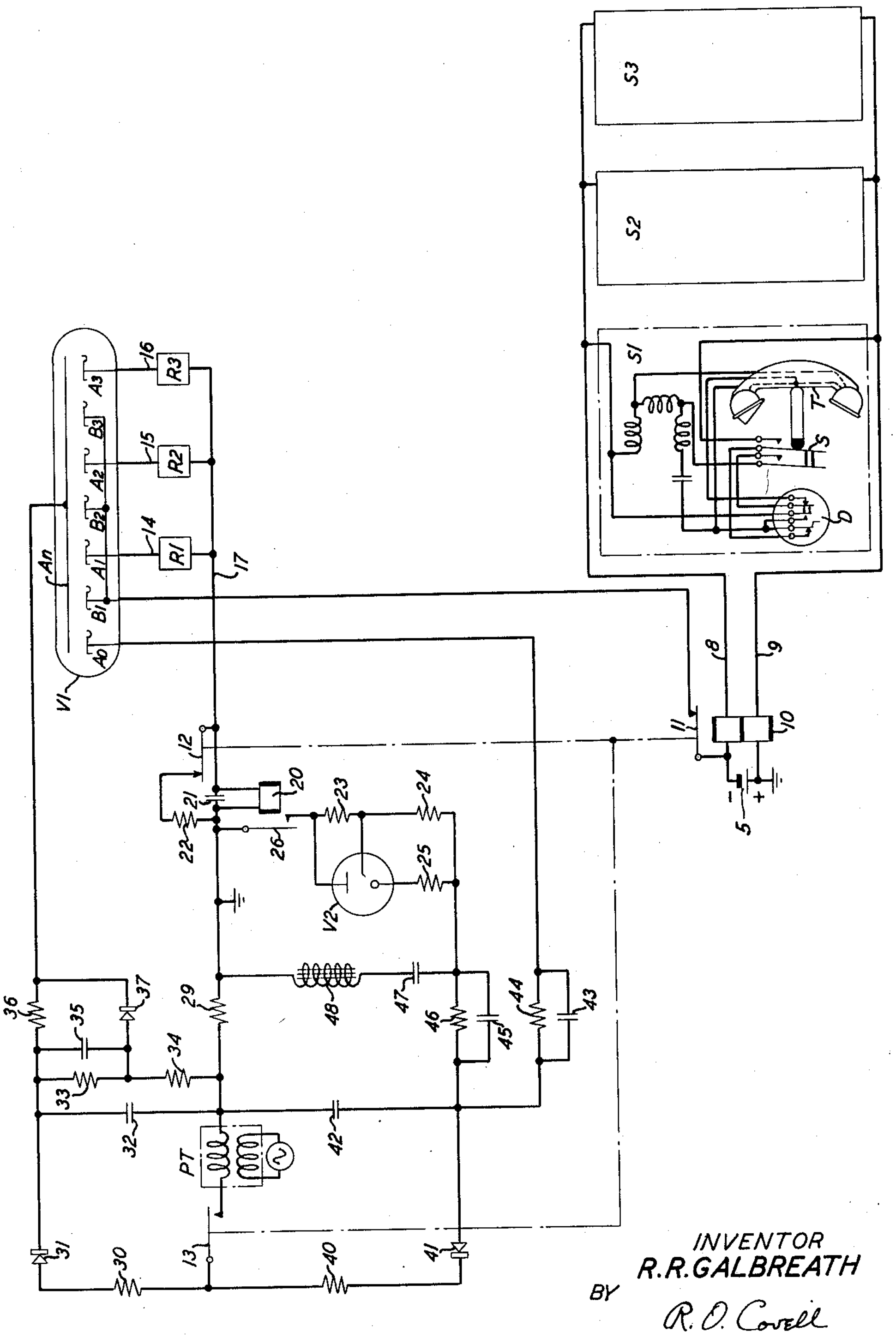
INVENTOR
R. R. GALBREATH
BY *R. O. Covell*
ATTORNEY United States Patent Office 2,811,586

Patented Oct. 29, 1957

2,811,586

INTERCOMMUNICATION SYSTEM

Robert R. Galbreath, Bernardsville, N. J., assignor to Bell Telephone Laboratories, Incorporated, New York, N. Y., a corporation of New York Application April 2, 1954, Serial No. 420,579

5 Claims. (Cl. 179—84)

This invention relates to telephone systems and particularly to a house or intercommunicating system arranged for dial selective signaling.

A general object of the invention is the improvement of house or intercommunicating telephone systems by providing a dial controlled cold cathode switching tube, in place of electromechanical switching means for selectively signaling the stations thereby minimizing switching noise, reducing power consumption and simplifying maintenance.

This invention pertains to an intercommunicating telephone system in which a cold cathode gas discharge stepping tube common to all of the stations responds to dial impulses from any calling one of the stations to close a signaling circuit for selectively signaling the called one of the stations. A feature of the invention is the provision of means for terminating the signaling of the called station within a predetermined interval of time or upon abandonment of the call by the calling station.

An intercommunicating system embodying the invention and its features is shown schematically in the drawing which consists of a single figure.

The system shown in the drawing comprises telephone stations S1, S2 and S3 interconnected by line conductors 8 and 9. Signaling equipment common to the stations comprises a line or impulse repeating relay 10, a cold cathode gas discharge stepping tube V1, a gas discharge triode V2 and a control relay 20, together with resistor, capacitor, inductor and rectifier elements interconnected to exercise the required selective ringing control.

The stepping tube V1, which may be similar in structure to that disclosed in detail in Patent 2,575,370 granted November 20, 1951, to M. A. Townsend has a single anode *An* common to a plurality of cathodes including a starting cathode A*o*, and in succession a B cathode and an A cathode for each station of the system. Each cathode, other than the starting cathode A*o*, is individually connected to the buzzer or other ringing device at a different one of the telephone stations. Each station is assigned a different digit, which is dialed at a calling station to selectively effect selective signaling of the called station. While only three stations are shown, the arrangement may be expanded to ten or more stations by providing a tube having the required number of A and B cathodes and providing a dial or other device capable of transmitting as many impulses in a train as there are stations.

A direct-current voltage source 5 of suitable voltage, for instance 24 volts, is connected through balanced windings of the line relay 10 to the line conductors 8, 9; and this source is also connected through normally closed contacts 11 of relay 10 to the B cathodes of the stepping tube. A transformer PT supplies 60-cycle, 120-volt alternating current through contacts 13 of relay 10 and resistors 30 and 40 to selenium half-wave rectifiers 31 and 41, thereby developing direct-current supply voltages of approximately 150 volts across each of condensers 32 and 42 for energizing stepping tube V1 and oscillator tube V2.

The telephone set at each station is similar to the set at station S1 and is of conventional design. It should be noted, however, that the signal devices at the stations are efficient tone devices such as ring armature telephone receivers, each signal device being connected by an individual signaling conductor 14, 15 or 16 to a different A cathode of the stepping tube V1 and by a common signal return conductor 17 in series with the winding of relay 20.

Assume now that the telephone T at station S1 is removed to close the switch S and thereby initiate a call. Relay 10 operates, thereby closing the power supply through contacts 13. At its contacts 11, relay 10 opens the connection between the B cathodes and the −24 volt potential source. The voltages developed across condensers 32 and 42 in series effect breakdown between the anode and normal position or starting cathode A*o* of tube V1. After breakdown, the cathode A*o* assumes a potential of about +15 volts with respect to ground potential due to the voltage drop across resistors 36 and 44.

When the dial D at the calling station is operated to transmit a train of pulses identifying the called station, each dial pulse effects the release and reoperation of relay 10. Assuming that the station S3 is being called, the digit 3 is dialed and a train of three pulses is transmitted, each pulse causing the release and reoperation of relay 10. The closing of contacts 11 upon release of relay 10 in response to the first dial pulse makes the B1 cathode negative with respect to the normal or starting cathode A*o*; whereby the discharge in tube V1 is transferred from cathode A*o* to cathode B1. When relay 10 reoperates at the end of the pulse, the opening of contacts 11 disconnects the −24 volt potential from cathode B1 and the discharge thereupon transfers from cathode B1 to cathode A1. Each succeeding pulse from the dial effects a similar transfer of the discharge from one A cathode to the next B cathode and then to the next A cathode; whereby the discharge is stepped to a position depending upon the digit dialed. The digit 3 having been dialed, the discharge path is stepped to cathode A3. During pulsing contacts 13 of relay 10 interrupt the 60 cycle, 120-volt supply voltage; but the capacity of condenser 32 is sufficient to maintain the direct-current voltage supply to the anode of tube V1. It is also to be noted that condenser 21 is discharged through contacts 12 each time relay 10 releases, so that there is insufficient current through the winding of relay 20 to effect its operation until contacts 12 remain open at the end of the train of dial pulses.

When relay 20 operates, after the discharge in tube V1 has been stepped to the A cathode corresponding to the called station, it closes contacts 26 thereby starting the operation of the oscillator which comprises the gas triode V2, limiting resistor 25, induction coil 48, condenser 47, voltage dividing resistors 23 and 24, resistor 46 shunted by condenser 45 and load resistor 29. A saw-tooth signal voltage is thus developed across resistor 29 to effect the transmission of signaling current in the signaling circuit which includes the ringing device R3 of the called station S3, the anode of tube V1, resistor 36 and condenser 32. To reduce the voltage drop across resistor 36, a by-pass is provided through rectifier 37 connected as a limiter biased by the voltage drop across resistor 33; and condenser 35 is connected across resistor 33 to make the limiter effective only at high frequencies.

During dialing and signaling, condenser 43 is discharging through resistor 44. When the normal or starting cathode A*o* becomes about 60 volts negative with respect to ground, the discharge in tube V1 will return to the cathode A*o*, thus terminating signaling of the called station at the end of a predetermined interval of time and effecting the release of relay 20. The release of relay 20 de-energizes the oscillator tube V2. The discharge between the anode and normal cathode A*o* of tube V1 continues for the duration of the call. When the telephone sets at both stations are returned to normal position, relay 10 releases, opening the power supply at contacts 13; tube V1 de-energizes and the control circuit is thus restored to normal.

Signaling may be repeated without first replacing and again removing the telephone set at the calling station, merely by repeating the dialing of the digit identifying the called station. In case the calling subscriber abandons the call during signaling, the release of relay 10 immediately terminates the signaling.

What is claimed is:

1. An intercommunication system comprising a plurality of telephone stations and an interconnecting line, a dial and a signal device at each station, a cold cathode gas discharge stepping tube common to said stations, said tube having an anode and a plurality of cathodes including in succession a starting cathode and pairs of cathodes, one pair for each said station, signaling conductors individually connecting the second cathode of each of said pairs to the signal device at a different one of said stations, a relay connected to said line, means comprising said relay for energizing said tube and for stepping the discharge path under the control of the dial at a calling station from one cathode to the next in succession to select the cathode connected to the signal device of the called station as identified by selective operation of the dial at the calling station, and means comprising a signal current generator for transmitting signal current through the selected second cathode and connected signaling conductor to energize the signal device at said called station.

2. An intercommunication system comprising a plurality of telephone stations and an interconnecting line, a dial and a signal device at each station, a cold cathode gas discharge stepping tube common to said stations, said tube having an anode and a plurality of cathodes including in succession a starting cathode and pairs of cathodes, one pair for each said station, signaling conductors individually connecting the second cathode of each of said pairs to one terminal of the signal device at a different one of said stations, an oscillator including a gas discharge tube for generating signaling voltage, a relay connected to said line for operation upon removal of the telephone at any one of said stations, means comprising normally open contacts of said relay for supplying operating potentials to said tubes, thereby to effect discharge between the anode and starting cathode of said tube when said relay is operated, means comprising normally closed contacts of said relay supplying a potential to the first of each of said pairs of cathodes for effecting the stepping of the discharge in said stepping tube from one cathode to the next in succession to select the cathode connected to the signal device of a called station as identified by selective operation of the dial at the calling station, means controlling the energization of said oscillator, said means comprising a relay connected to the other terminal of each of said signal devices for energization in the discharge path between the anode and the selected one of said second cathodes of the stepping tube, and means applying the signaling voltage generated by said oscillator to energize the signal device in series with the selected second cathode and thus signal the called station.

3. An intercommunicating system comprising a plurality of telephone stations, each station including a telephone set, a switch, a dial and a signal device, a line interconnecting said stations, and signaling control means common to said stations, each station being assigned a different digit which may be dialed at any calling station to effect selective signaling of the station thereby identified, said control means comprising a line relay connected to said line for energization upon closing of the switch at any of said stations to call another station, said line relay responsive to dial pulses created by selective operation of the dial at any calling station to identify the called station, a gas discharge stepping tube common to said stations, said tube having an anode and a plurality of cathodes in succession including a starting cathode and a pair of cathodes for each of said stations, means including an oscillator tube for generating signaling voltage for energizing said signal devices, means under the control of said line relay for supplying operating potentials to said tubes including the supply of a stepping potential to the first cathode of each of said pairs each time said line relay releases responsive to a dial impulse received from a calling one of said stations, signaling conductors individually connecting the second cathodes of each of said pairs of cathodes to one terminal of the signal device at each of said stations, a signaling control relay connected to the other terminal of each of the signal devices at said stations for energization in series with any selected one of said second cathodes, means including said relay for starting the operation of said oscillator, and means for applying the signaling voltage generated by said oscillator to energize the signal device connected to the selected one of said second cathodes.

4. An intercommunicating system according to claim 3 comprising delay means for preventing the operation of said signaling control relay until all of the dial impulses in the digital train identifying the called station have been received by said line relay.

5. An intercommunicating system according to claim 4 comprising means for delaying operation of said signaling control relay for an interval longer than the maximum interval between impulses in a digital train, and means effective a predetermined interval of time after the first impulse of a digital train is received by said line relay for effecting return of the discharge path in said stepping tube from any selected one of said second cathodes to said starting cathode, thereby to release said signal control relay and thus terminate the energization of said oscillator tube.

References Cited in the file of this patent

UNITED STATES PATENTS

| | | |
|---|---|---|
| 1,665,466 | Middleton | Apr. 10, 1928 |
| 2,619,528 | Vroom | Nov. 25, 1952 |